United States Patent
Wood et al.

[11] Patent Number: 5,808,721
[45] Date of Patent: Sep. 15, 1998

[54] OPHTHALMIC LENS WAFERS AND RECEIVER FOR REGISTERING SUCH WAFERS

[75] Inventors: Kenneth O. Wood, West Stafford, Conn.; David J. Logan, Monterey, Mass.; Alexander Flavio Incera, Pomfret Ctr., Conn.

[73] Assignee: Gerber Optical. Inc., South Windsor, Conn.

[21] Appl. No.: 620,469

[22] Filed: Mar. 22, 1996

[51] Int. Cl.⁶ .............. G02C 7/02; G02C 7/06; G02C 7/08

[52] U.S. Cl. .......... 351/159; 351/166; 351/172; 351/177

[58] Field of Search .......... 351/166, 177, 351/172, 159

[56] References Cited

U.S. PATENT DOCUMENTS

| | | | |
|---|---|---|---|
| 3,674,587 | 7/1972 | Laliberte | 156/245 |
| 4,441,795 | 4/1984 | Lobdell | 351/169 |
| 4,474,355 | 10/1984 | Greshes | 249/53 |
| 4,702,785 | 10/1987 | Burger | 156/91 |
| 4,838,675 | 6/1989 | Barkan et al. | 351/169 |
| 4,892,403 | 1/1990 | Merie | 351/168 |
| 4,927,480 | 5/1990 | Vaughan | 156/228 |
| 4,940,205 | 7/1990 | Rudd et al. | 249/63 |
| 4,989,316 | 2/1991 | Logan et al. | 29/527 |
| 5,026,469 | 6/1991 | Kunkel et al. | 204/298.15 |
| 5,124,019 | 6/1992 | Kunket et al. | 204/298.15 |
| 5,147,585 | 9/1992 | Blum | 264/1.4 |
| 5,149,181 | 9/1992 | Bedford | 351/166 |
| 5,178,800 | 1/1993 | Blum | 156/539 |
| 5,286,419 | 2/1994 | Van Lighten et al. | 264/1.3 |
| 5,399,227 | 3/1995 | Abrams | 156/539 |
| 5,412,505 | 5/1995 | Van Ligten et al. | 351/163 |
| 5,433,810 | 7/1995 | Abrams | 156/273.7 |
| 5,478,420 | 12/1995 | Gauci et al. | 156/89 |

OTHER PUBLICATIONS

European Search Report from corresponding European Application No. 97104800.4 citing the above–listed references.

Untitled literature describing the manufacture of eyeglass lenses, pp. 15–34 (dated more than one year prior to the filing date of this application).

Sola Optical USA, "Owner's Manual for the Matrix® Lens Processing System, Version 1.5", Oct. 1995.

*Primary Examiner*—Scott J. Sugarman
*Attorney, Agent, or Firm*—McCormick, Paulding & Huber

[57] ABSTRACT

Ophthalmic lens wafers for forming a composite lens are provided wherein each front lens wafer has a front registration pattern formed on its peripheral edge, and each back lens wafer has a back registration pattern formed on its peripheral edge which is different than the front registration pattern. If the ophthalmic lens wafers include optical axes, such as horizontal axes for multi-focal segments or astigmatism axes, each registration pattern is oriented at a predetermined angle relative to the respective optical axis for facilitating alignment of the optical axes relative to each other when forming a composite lens in accordance with a particular prescription. Each lens registration pattern may be formed by a pair of notches on the peripheral edge of the wafers, or by a pair of lobes on the peripheral edge of the wafers. A receiver is also provided for holding and registering the ophthalmic lens wafers when laminating or otherwise forming a composite lens. The receiver defines a stepped recess formed by a plurality of circular-shaped steps, and each step includes at least one registration pattern which matches the registration pattern of either a front or back lens wafer, but not both. The registration patterns of the receiver may be formed by key pairs which are shaped and positioned relative to each other to mesh with a respective lens registration pattern. The key pairs may likewise be retractable for generating different registration patterns to receive different wafer types on the same step of the receiver. Alternatively, the registration pattern of the receiver may be formed by recessed surface areas for receiving corresponding lobes on the lens wafers. The recessed surface areas may likewise be formed by retractable surface sections for generating different registration patterns to receive different wafer types on the same step of the receiver.

20 Claims, 2 Drawing Sheets

OPHTHALMIC LENS WAFERS AND RECEIVER FOR REGISTERING SUCH WAFERS

FIELD OF THE INVENTION

The present invention relates to apparatus and methods for making optical lenses having at least two lens elements or wafers laminated together to form a compound lens, and more particularly, to such apparatus and methods for holding and registering the lens wafers when laminating a compound lens.

BACKGROUND INFORMATION

Prescription eyeglass lenses have conventionally been produced by providing a pair of lens blanks, of glass or plastic, having two major lens surfaces. One of these surfaces is cut with a grinding tool to generate a lens surface having a shape closely approximating that of the prescribed lens. The ground lens surface is then fined by rubbing this surface with a lap having an abrasive surface to create a surface form that meets the prescription, and the fined surface is then polished to optical clarity. If desired, the lens may then be coated for tinting, anti-reflection, scratch resistance, etc.

One of the drawbacks of this conventional approach is that it is relatively time consuming and requires a significant amount of expertise and expense. Although computer-controlled machinery has been developed and is now widely used to quickly generate, fine and polish lens blanks to meet any prescription, this equipment is relatively expensive, preventing its use by most optometrists and/or merchants. Accordingly, rather than stock eyeglass lenses for all potential customers' prescriptions, these individuals and/or companies have been required to order lenses for many prescriptions from a distant laboratory or manufacturer, requiring their customers to wait one or more days to receive their eyeglasses.

In an attempt to avoid these and other drawbacks associated with conventional eyeglass lens production, several manufacturers have been working to develop wafer lamination systems wherein a front lens wafer and a back lens wafer are laminated together to form a composite lens. Each wafer is provided in finished and polished form so as to provide selected optical properties, and in order to produce a particular prescription lens, selected front and back wafers are combined and aligned relative to each other so that the combined optical properties of the wafers form the prescribed lens. The primary advantage of this type of system is that a relatively small inventory of wafers may be stocked and used to make composite lenses satisfying hundreds of thousands of multi-focal and single-vision prescriptions. In addition, the wafers may be pre-tinted, or pre-coated with, for example, an anti-reflection or scratch-resistant coating, thus avoiding the need to send the lenses to a distant laboratory or like facility to apply such a coating as is now frequently required.

In a typical wafer lamination system, a composite lens is formed by placing the selected front lens wafer into a lens holder with its concave or back side facing up. A predetermined quantity of adhesive is then applied to the back side of the front wafer, and the convex or front side of a selected back lens wafer is then superimposed over the front wafer and aligned relative to the front wafer in accordance with the requirements of a particular prescription. The two lens wafers are then squeezed together to spread the adhesive throughout the interface between the wafers.

Lens wafers are currently provided with ink markings for manually aligning the wafers with corresponding markings on a lens holder or jig and for aligning the wafers relative to each other. One of the drawbacks of this type of approach is that an operator may have difficulty recognizing or discerning the ink markings because of reflective surfaces, tints and/or polarized materials on the wafers.

In addition, current wafer lamination systems typically do not provide a back-up system for ensuring that an operator will properly place each lens wafer in the lens holder, or to ensure that the operator will properly align the wafers relative to each other in accordance with a particular prescription. Because of the similarities in appearance, it would not be unreasonable for an operator to confuse a front lens wafer for a back lens wafer, or vice-versa, and to in turn incorrectly assemble and laminate the wafers. An operator may likewise incorrectly position a lens wafer in its holder, such that the wafer is tilted or inverted, or may simply misalign one or both wafers because of fatigue or mental error. If this occurs, once the adhesive is applied and the wafers are pressed together, the defective lens may then have to be discarded.

Accordingly, it is an object of the present invention to overcome many of the drawbacks and disadvantages of such prior art wafer lamination systems.

SUMMARY OF THE INVENTION

The present invention is directed to ophthalmic lens wafers for forming composite lenses wherein each front lens wafer includes a front registration pattern formed on its peripheral edge, and each back lens wafer includes a back registration pattern formed on its peripheral edge which is different than the front registration pattern. If the ophthalmic lens wafers include optical axes, such as horizontal axes for multi-focal segments or astigmatism axes, each registration pattern is oriented at a predetermined angle relative to the respective optical axis for facilitating alignment of the optical axes relative to each other when forming a composite lens in accordance with a particular prescription. Each lens registration pattern may be formed by one or more recessed surfaces areas or notches, or by one or more raised surface areas or lobes formed on a peripheral edge of the wafers.

The present invention is also directed to a receiver for holding and registering the ophthalmic lens wafers when laminating or otherwise forming a composite lens. The receiver defines at least one support surface for receiving and supporting a lens wafer, and each support surface includes at least one registration pattern which matches the registration pattern of either a front or back lens wafer, but not both. The registration patterns of the receiver may be formed by a plurality of keys which are shaped and positioned relative to each other to mesh with a respective lens registration pattern. The keys may likewise be retractable for generating different registration patterns to receive different wafer types on the same support surface. Alternatively, the registration pattern of the receiver may be formed by recessed surface areas for receiving corresponding raised surface areas on the lens wafers. The recessed surface areas may likewise be formed by retractable surface sections of the receiver for generating different registration patterns to receive different wafer types on the same support surface.

One advantage of the present invention is that the registration patterns of the lens wafers and receiver prevent an operator from placing the wrong lens wafer into a receiver, or from incorrectly positioning a lens wafer in the receiver.

Other objects and advantages of the present invention will become apparent in view of the following detailed description and accompanying drawings.

DETAILED DESCRIPTION OF THE PREFERRED EMBODIMENTS

Figure 1:
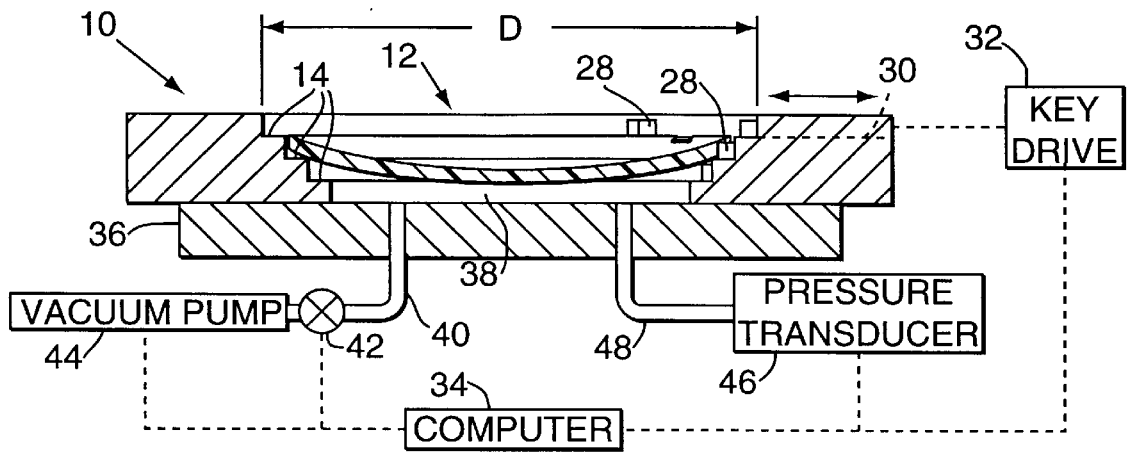
FIG. 1 is a partial schematic, cross-sectional view of a receiver embodying the present invention for holding and registering ophthalmic lens wafers.

In FIG. 1, a receiver embodying the present invention for holding and registering one or more ophthalmic lens wafers is indicated generally by the reference numeral 10. The receiver 10 defines a stepped recess 12 extending through the central portion thereof for receiving either a front or back lens wafer. As shown in FIG. 1, the stepped recess 12 is defined by a plurality of circular-shaped steps or lens support surfaces 14 of decreasing diameter, wherein each step of the recess is dimensioned to receive a respective size of wafer. Currently, wafers are provided in 65, 70 and 75 mm diameters, and therefore the receiver 10 defines three steps 14 and each step corresponds in diameter to a respective one of these wafer diameters. As shown typically in FIG. 1, each step defines an outer diameter D which is greater than the diameter of the respective wafer to be received on that step, and for all but the largest wafers, the outer diameter D is less than the diameter of the next larger-sized wafer.

Figure 2:
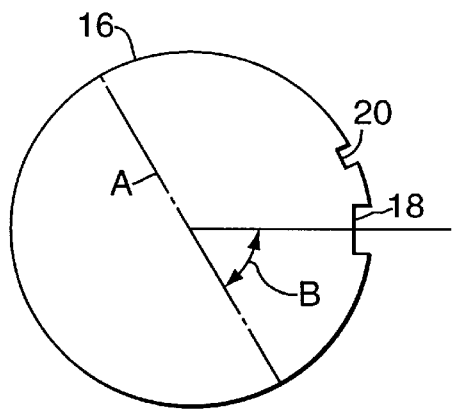
FIG. 2 is a plan view of a front lens wafer defining a "front" registration pattern formed by notches on its edge in accordance with the present invention.
Figure 3:
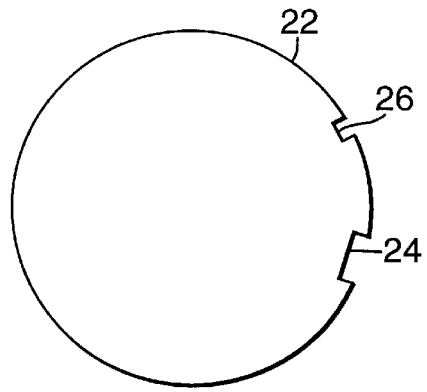
FIG. 3 is a plan view of a back lens wafer defining a "back" registration pattern formed by notches on its edge in accordance with the present invention.

In accordance with the present invention, the receiver 10 and lens wafers are provided with means for registering the wafers. With reference to FIG. 2, a typical front lens wafer 16 includes a "front" registration pattern formed on its peripheral edge and defined by a first notch 18 and a second notch 20 spaced a predetermined distance from the first notch. Similarly, as shown in FIG. 3, a typical back lens wafer 22 includes a "back" registration pattern formed on its peripheral edge defined by a first notch 24 and a second notch 26 spaced a predetermined distance from the first notch. As can be seen, in the embodiment of the present invention illustrated, although the first notches 18 and 24 are the same size and shape and the second notches 20 and 26 are the same size and shape, the spaces between each pair of first and second notches are different, thus defining different registration patterns.

Correspondingly, as shown in FIG. 1, each step 14 of the receiver 10 includes at least one registration pattern formed by a pair of keys 28 which are dimensioned and spaced relative to each other to match either the front or back registration pattern of the lens wafers, but not both. Accordingly, each pair of keys 28 can be received within the notch pair (or registration pattern) of either a front or back lens wafer, thus permitting only one type of lens wafer to be seated on the respective step of the receiver.

Many ophthalmic lens wafers define an optical axis, such as a horizontal axis of a multi-focal lens surface, typically located on a front lens wafer, or an astigmatism axis, typically located on a back lens wafer. When both wafers of a composite lens include optical axes, it is necessary to align the axes relative to each other to meet the particular prescription. Thus, in accordance with the present invention, the registration pattern of each lens wafer having an optical axis is oriented at a predetermined angle relative to the respective axis. As shown, for example, in FIG. 2, the front lens wafer 16 may have an optical axis A, and therefore the first notch 18 of the front registration pattern is oriented at a predetermined angle B relative to the optical axis A. Accordingly, when the front lens wafer 16 is loaded into the receiver 10, the exact position of the optical axis relative to the registration pattern (or other reference point on the receiver) is known, or may be easily derived from the predetermined angle B. This is particularly advantageous for purposes of automatically aligning the wafers (and thus the optical axes) relative to each other, and for automatically laminating the wafers under the control of a computer, as is described further below.

In one embodiment of the present invention, each receiver 10 may be designed as either a "front" lens receiver or as a "back" lens receiver. In this case, each step of the receiver includes a registration pattern formed by a pair of fixed keys 28 which are shaped and spaced relative to each other to match either the front or back registration pattern, but not both.

Alternatively, a single receiver 10 may be provided with means for forming two or more registration patterns on each step 14 of the recess 12 so that the same step may receive more than one type of lens wafer. In accordance with another embodiment of the present invention, the receiver 10 may be provided with retractable keys, wherein each step of the recess includes at least three retractable keys such that one pair of the three keys matches the front registration pattern and another pair of the three keys matches the back registration pattern. As shown typically in broken lines in FIG. 1, each retractable key 28 may be slidably received within a respective channel 30 formed in the body of the receiver, and each key (or each pair of keys) may in turn be drivingly connected to a respective key drive 32. Each key drive may be, for example, a solenoid-actuated plunger or like drive system for moving the respective key(s) into and out of the stepped recess depending upon whether a front or back wafer is to be loaded into the respective step of the receiver.

As also shown typically in FIG. 1, the key drives 32 are each connected to a control computer 34 for automatically controlling actuation of the keys in order to ensure that the lens wafers are loaded in the correct or desired sequence for laminating the lenses. As another alternative, each pair of retractable keys may be manually actuated in any of numerous ways known to those skilled in the pertinent art. With manually-actuated keys, it would be desirable to mount a sensor, such as a micro-switch or other type of electronic sensor (not shown), adjacent to each key or pair of keys to sense their positions, and to in turn transmit signals to the control computer 34 indicative of the key positions so that the computer may monitor the key positions and instruct the operator to adjust the keys when required.

As another alternative to providing retractable keys, each receiver may be provided with more than one stepped recess 12 located side-by-side within the body of the receiver, wherein the fixed keys in each stepped recess match a particular registration pattern so that each stepped recess (or each step within a recess) may receive either a front or back lens wafer, but not both. If the composite lenses are designed to incorporate more than two wafers, then the receiver may include more than two stepped recesses, wherein each stepped recess includes a registration pattern matching that of one of the respective wafer types.

The receiver 10 may also include means for detecting the position of a lens wafer in the receiver and/or for ensuring that each lens wafer is correctly positioned within the receiver prior to laminating the wafers. As shown in FIG. 1, a back plate 36 is mounted against the base of the receiver 10 so as to seal the opening in the base of the stepped recess 12 and in turn define an evacuatable chamber 38 between the base of a lens seated within the receiver and the back plate. A vacuum tube 40 is coupled on one end through the back plate in fluid communication with the chamber 38, and is connected on the other end through a valve 42 to a vacuum pump 44 to evacuate the chamber under the control of the computer 34. A pressure transducer 46, or like pressure sensor, is also coupled in fluid communication with the chamber 38 through a conduit 48 extending through the back plate 36, and the sensor transmits signals to the computer 34 indicative of the pressure in the chamber.

Accordingly, when a lens wafer is loaded into the receiver 10, the computer actuates the valve 42 to connect the vacuum pump 44 in fluid communication with the chamber 38 to evacuate the chamber. If the lens wafer 16 or 22 is properly seated on the respective step 14 of the recess 12, then the pressure in the chamber 38 will drop and the pressure transducer 46 will transmit signals indicative of the pressure drop to the computer 34. If, however, the lens wafer is not properly seated within the receiver, or if the wrong lens wafer is placed in the receiver, a gap will be formed between the lens wafer and the respective step of the receiver, and the pressure sensor 46 will transmit signals to the computer 34 indicating that the chamber 38 is at or near atmospheric pressure. The computer 34 is preferably programmed to respond to this condition by transmitting an alarm signal to the operator, such as by illuminating a warning lamp, and by otherwise preventing the operator from further proceeding without correcting the defective condition.

One advantage of the present invention is that the registration patterns formed on the peripheral edges of the lens wafers, and the matching registration patterns of the receivers can effectively prevent an operator from placing the wrong lens wafer into a receiver, or from placing a lens wafer in the wrong position in a receiver. As described above, the registration pattern of the receiver, which may be formed by a key pair as described above, will only mesh with a matching registration pattern on a lens wafer. Accordingly, a particular receiver will be configured to only receive a front or back lens wafer, but not both types. Similarly, the registration patterns will permit the correct lens wafer to be properly seated only one way in the receiver (i.e., with the registration pattern on the wafer meshing with the registration pattern of the receiver), thus preventing an operator from incorrectly inverting a lens wafer or from placing the wafer in the wrong angular position so as to cause a misalignment of the wafers. If the operator places the wrong type of lens wafer in the receiver, or incorrectly positions the correct lens wafer in the receiver (e.g., by tilting or inverting the wafer), the pressure sensor will transmit an error signal to the computer to correct the condition.

As mentioned above, the receivers and lens wafers of the present invention are particularly suitable for use in an apparatus for automatically laminating lens wafers, such as the apparatus described in the co-pending patent application entitled "Apparatus For Making Ophthalmic Lenses By Vacuum Lamination", Ser. No. 08/620,468, filed on Mar. 22, 1996 which is assigned to the same Assignee as this application, and is hereby expressly incorporated by reference as part of the present disclosure. In such an automated lamination system, once a wafer is loaded and properly seated into a receiver, the automated system as described, for example, in the above-mentioned co-pending patent application, may then automatically align the wafers relative to each other and laminate the wafers under the control of a computer without further operator handling or intervention.

As will be recognized by those skilled in the pertinent art, the registration patterns of the lens wafers and receivers may take any of numerous different shapes and/or configurations in accordance with the present invention. In the embodiment of the present invention illustrated in FIGS. 2 and 3, each notch is generally rectangular-shaped and has a depth of approximately ½ millimeter. However, the dimensions and shape of each notch may be varied, as may be the relative positioning of the notches depending upon the requirements of a particular system. One advantage of providing two notches on each wafer, is that the registration pattern will prevent each wafer from being incorrectly inverted when seated in the receiver. However, if desired, a single distinctive notch may be employed or more than two notches may be employed to define each registration pattern. For example, a registration pattern formed by a single recessed surface area (or raised surface area as described below) on the peripheral edge of each lens wafer, which is oriented at a predetermined angle relative to an optical axis of the respective wafer, would be sufficient for purposes of permitting automated alignment of the optical axes of the lens wafers relative to each other. In order to prevent incorrect inversion of a lens in the receiver, however, it may be necessary to provide more than one notch or to provide a uniquely-shaped notch designed to facilitate detection of such inversion. One advantage of forming notches or like recessed surface areas in the peripheral edges of the wafers, is that they may be relatively easily formed by a secondary cutting step after the lens wafers are molded. Accordingly, it is not necessary to modify or otherwise be concerned with affecting the wafer molding process. In addition, the notches or like recessed surface areas may be easily removed after lamination of the composite lens when edging the lens in a conventional manner.

Figure 4:
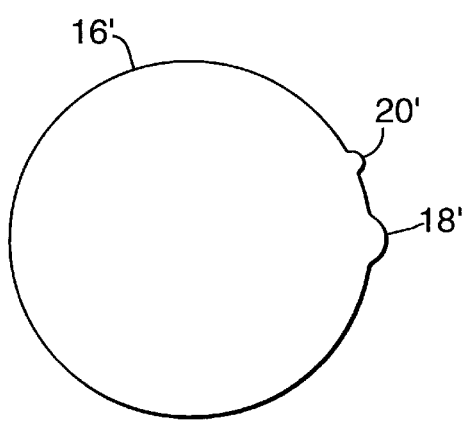
FIG. 4 is a plan view of another embodiment of a front lens wafer defining a "front" registration pattern formed by lobes on its edge in accordance with the present invention.
Figure 5:
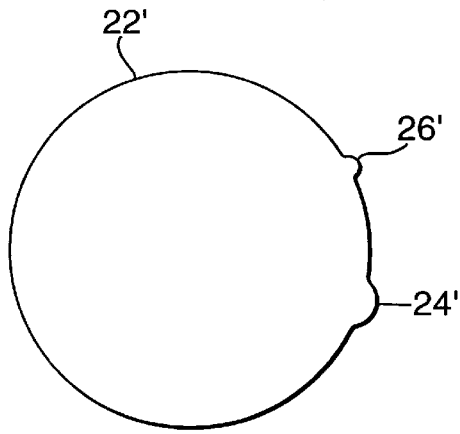
FIG. 5 is a plan view of another embodiment of a back lens wafer defining a "back" registration pattern formed by lobes on its edge in accordance with the present invention.

However, as shown typically in FIGS. 4 and 5, it may be desirable to form the registration pattern on each lens wafer with one or more distinctive raised surface areas, and to form the matching registration pattern on the receiver(s) with one or more depressed surface areas which are shaped and spaced relative to each other so as to match the registration pattern of the lens wafer and receive its corresponding raised surface areas. With reference to FIG. 4, a typical front lens wafer 16' includes a front registration pattern formed by a first lobe 18' on its peripheral edge, and a second smaller lobe 20' on its peripheral edge spaced a predetermined distance from the first lobe. Similarly, as shown in FIG. 5, a typical back lens wafer 22' includes a back registration pattern formed by a first lobe 24' on its peripheral edge, and a second smaller lobe 26' on its peripheral edge spaced a predetermined distance from the first lobe. As can be seen, although the first lobes are the same size as each other, and the second lobes are the same size as each other, the predetermined distances between the lobes are different, thus defining different front and back registration patterns.

Figure 6:
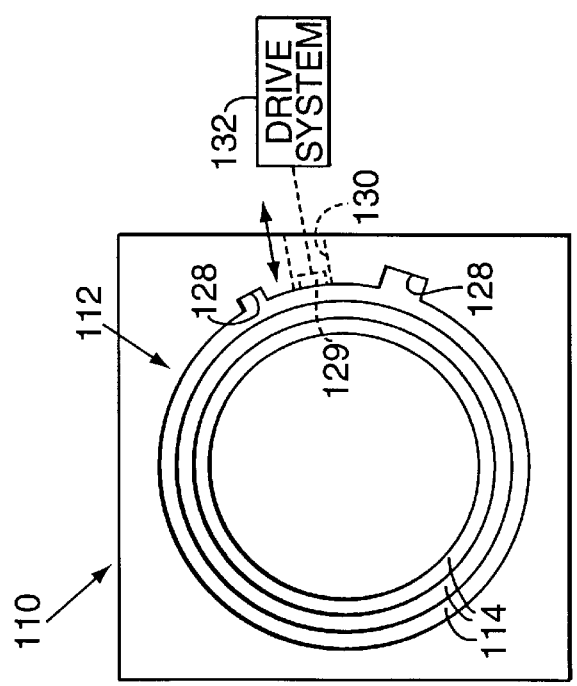
FIG. 6 is a partial schematic, top plan view of another embodiment of a receiver for holding and registering the ophthalmic lens wafers of FIGS. 4 and 5 in accordance with the present invention.

With reference to FIG. 6, another receiver embodying the present invention for use with the lens wafers of FIGS. 4 and 5, is indicated generally by the reference numeral 110. The receiver 110 is the same in many respects as the receiver 10 described above, and therefore like reference numerals preceded by the numeral 1 are used to indicate like elements. The receiver 110 includes on its step 114 a registration pattern formed by a pair of recessed surface areas 128 which, as can be seen, are shaped and spaced relative to each other to match the back registration pattern of the back lens wafer 22' (FIG. 5), but not the front registration pattern of the front lens wafer 16' (FIG. 4).

Alternatively, the receiver 110 may be provided with retractable surface sections so as to selectively form on each step either a front registration pattern or a back registration pattern to alternatively receive either type of lens wafer. As shown typically in FIG. 6, each recess 128 may be formed by a retractable surface section 129 mounted within a channel 130 formed within the body of the receiver. As indicated by the arrows in FIG. 6, each retractable surface section 129 may be moved toward and away from the respective step of the receiver so as to create or fill a respective recess 128. A drive system 132 shown typically in FIG. 6 is preferably drivingly connected to each retractable surface section 129 to move the respective surface section toward and away from the respective step 114. Each drive 132 may be, for example, a solenoid-actuated plunger or like drive system for actuating the respective surface section under the control of a computer (FIG. 1) in order to automatically create a respective registration pattern under the control of the computer to receive a respective wafer type. Although not shown, the receiver 110 in FIG. 6 may be provided with retractable surface sections 129 instead of the two recesses 128 illustrated, and each of the three retractable surface sections may be selectively actuated by a control computer to generate either a front or back registration pattern on the respective step of the receiver.

Figure 8:
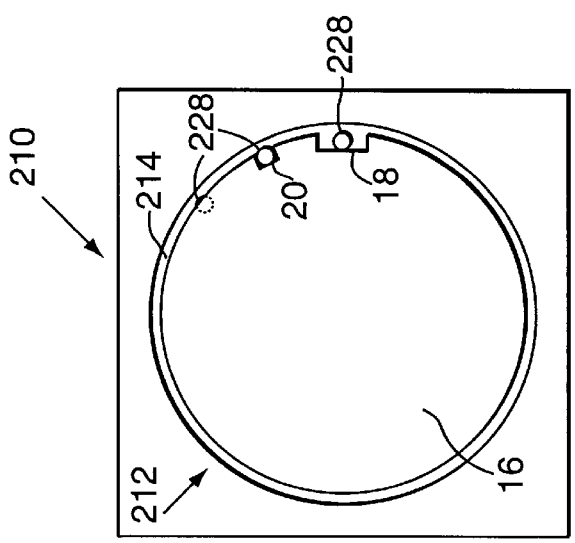
FIG. 8 is a top plan view of the receiver of FIG. 7 illustrating a lens wafer loaded into the receiver.
Figure 7:
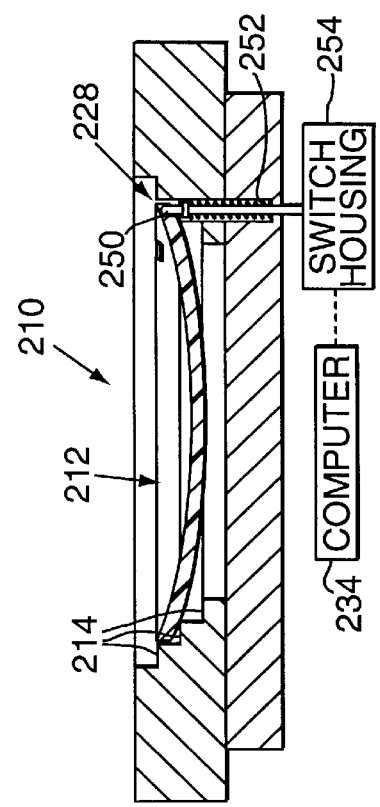
FIG. 7 is a partial schematic, cross-sectional view of another embodiment of a receiver of the present invention including a plurality of retractable switches forming the registration patterns of the receiver.

Turning to FIGS. 7 and 8, another receiver embodying the present invention is indicated generally by the reference numeral 210. The receiver 210 is the same in many respects as the receiver 10 described above, and therefore like reference numerals preceded by the numeral 2 are used to indicate like elements. Instead of the retractable keys, the receiver 210 includes a plurality of retractable switches shown typically at 228 which are each mounted within the body of the receiver and project into a respective step 214 of the stepped recess 212. As with the retractable keys, the switches are located on each step 214 and positioned relative to each other so as to match one or more lens wafer registration patterns. As shown typically in FIG. 8, a respective step 214 of a receiver may include three retractable switches 228 which are shaped and positioned relative to each other so that one pair of the three switches will match the front registration pattern of the front lens wafer 16 of FIG. 1, and another pair of the three switches will match the back registration pattern of the back lens wafer of FIG. 2.

Each retractable switch 228 may be a micro-switch or like sensor which generates an electrical signal when the switch is engaged by a lens wafer. As shown typically in FIG. 7, each switch may include a prong or like switch member 250 which is biased upwardly by a spring 252 or like biasing member through the respective step 214 of the receiver. Each prong 250 and spring 252 are mounted on a respective switch housing 254 including electrical contacts (not shown) for engaging the prong when pushed into the housing against the bias of the respective spring to close an electric circuit, and in turn generate an electrical signal to a control computer 234 to indicate switch closure. Accordingly, with reference to FIG. 8, when a front lens wafer 16 is placed in the step 214 of the receiver shown, two of the prongs will be received within the matching notches 18 and 20 of the lens wafer, and a select third prong will be depressed, thus indicating to the computer that a front lens wafer is loaded into the receiver. Similarly, if a back lens wafer 22 is placed in the same step of the receiver, a different pair of prongs will be received in the matching notches of the wafer, and another switch will be actuated, thus indicating to the computer that a back lens wafer is loaded in the receiver. Accordingly, the computer can monitor the wafers loaded in the receiver, and warn or otherwise instruct the operator when the wafers are not properly seated or are not loaded in the proper sequence.

As will be recognized by those skilled in the pertinent art, each switch may be shaped and configured so as to match or otherwise mesh with one or more registration patterns formed on the peripheral edges of the lens wafers. Similarly, the switches may not necessarily project upwardly through the supporting surfaces of the receiver, but may project into the stepped recess at a different orientation, such as horizonatally. It may also be desirable to include only two retractable switches on each step of the recess, and provide a fixed key or like member to be received within a common notch or recess provided on all lens wafers.

As will be recognized by those skilled in the pertinent art, numerous modifications may be made to the above-described and other embodiments of the present invention without departing from its scope as defined in the appended claims. Accordingly, this detailed description of the preferred embodiments is to be taken in an illustrative as opposed to a limiting sense.

What is claimed is:

1. At least two ophthalmic lens wafers for forming a composite lens, comprising a first lens wafer and a second lens wafer adapted to be superimposed over the first lens wafer, the first lens wafer defining a first optical axis and including a first registration pattern formed on a peripheral edge of the wafer and oriented at a predetermined angle relative to the first optical axis, and the second lens wafer defining a second optical axis and including a second registration pattern formed on a peripheral edge of the wafer and oriented at a predetermined angle relative to the second optical axis, wherein the second registration pattern is different than the first registration pattern for facilitating alignment of the first and second optical axes relative to each other when forming the composite lens in accordance with a particular prescription.

2. At least two ophthalmic lens wafers as defined in claim 1, wherein the first and second registration patterns are each formed by at least one recessed surface area defined in the peripheral edge of the respective lens wafer and oriented at a predetermined angle relative to the respective optical axis.

3. At least two ophthalmic lens wafers as defined in claim 1, wherein the first and second registration patterns are each formed by a pair of recessed surface areas defined in the peripheral edge of the respective lens wafer and spaced a predetermined distance relative to each other, and the predetermined distance for the first pair is different than the predetermined distance for the second pair.

4. At least two ophthalmic lens wafers as defined in claim 2, wherein each recessed surface area forms a generally rectangular-shaped notch.

5. At least two ophthalmic lens wafers as defined in claim 1, wherein the first and second registration patterns are each defined by at least one raised surface area formed on the peripheral edge of the respective lens wafer and oriented at a predetermined angle relative to the respective optical axis.

6. At least two ophthalmic lens wafers as defined in claim 1, wherein the first and second registration patterns are each defined by a pair of raised surface areas formed on the peripheral edge of the respective lens wafer and spaced a predetermined distance relative to each other, and the predetermined distance for the first pair is different than the predetermined distance for the second pair.

7. At least two ophthalmic lens wafers as defined in claim 5, wherein each raised surface area defines a lobe.

8. At least two ophthalmic lens wafers as defined in claim 1, wherein the first optical axis is the horizontal axis of a multi-focal surface and the second optical axis is an astigmatism axis.

9. At least two ophthalmic lens wafers as defined in claim 1, in combination with a receiver defining at least one support surface for receiving at least one of the first and second lens wafers and including at least one registration pattern matching one of the first or second registration patterns, but not both, for receiving and supporting the respective lens wafer having the matching registration pattern.

10. At least two ophthalmic lens wafers in combination with a receiver as defined in claim 9, wherein the at least one registration pattern of the receiver is formed by a pair of keys spaced relative to each other in accordance with the matching first or second registration pattern.

11. At least two ophthalmic lens wafers in combination with a receiver as defined in claim 10, wherein at least one key is slidably mounted within the receiver for moving the key toward and away from the respective support surface of the receiver, and further including means for actuating the at least one key to form a registration pattern matching the registration pattern of a wafer to be loaded into the receiver.

12. At least two ophthalmic lens wafers in combination with a receiver as defined in claim 9, wherein the at least one registration pattern of the receiver is formed by at least one recessed surface area shaped and positioned adjacent to a peripheral edge of the support surface in accordance with the matching first or second registration pattern.

13. At least two ophthalmic lens wafers in combination with a receiver as defined in claim 12, wherein the at least one recessed surface area is formed by a retractable surface section of the receiver which is movable toward and away from the respective support surface of the receiver, and further including means for actuating the at least one retractable surface section to form a registration pattern matching the registration pattern of a wafer to be loaded into the receiver.

14. At least two ophthalmic lens wafers in combination with a receiver as defined in claim 9, wherein the registration pattern of the receiver is formed by at least one retractable switch shaped and positioned in accordance with the matching registration pattern of the lens wafer type, and is responsive to engagement with a lens wafer seated on the support surface to transmit an electrical signal indicative thereof.

15. At least two ophthalmic lens wafers in combination with a receiver as defined in claim 9, further including means for detecting whether a lens wafer is seated in substantially continuous peripheral engagement with the support surface.

16. At least two ophthalmic lens wafers for forming a composite lens, comprising a first lens wafer and a second lens wafer adapted to be superimposed over the first lens wafer, wherein the first lens wafer defines a first optical axis and includes first means for registering the first lens wafer with the second lens wafer, wherein the first means is formed on a marginal portion of the first lens wafer and is oriented at a predetermined angle relative to the first optical axis, and the second lens wafer defines a second optical axis and includes second means for registering the second lens wafer with the first lens wafer and forming a composite lens in accordance with any of a plurality of different ophthalmic lens prescriptions, wherein the second means is different than the first means, is formed on a marginal portion of the second lens wafer, and is oriented at a predetermined angle relative to the second optical axis.

17. At least two ophthalmic lens wafers as defined in claim 16, wherein the first and second means are each formed by at least one recessed surface area defined in the peripheral edge of the respective lens wafer and oriented at a predetermined angle relative to the respective optical axis.

18. At least two ophthalmic lens wafers as defined in claim 16, wherein the first and second means are each formed by a pair of recessed surface areas defined in the peripheral edge of the respective lens wafer and spaced a predetermined distance relative to each other, and the predetermined distance for the first pair is different than the predetermined distance for the second pair.

19. At least two ophthalmic lens wafers as defined in claim 16, wherein the first and second means are each defined by at least one raised surface area formed on the peripheral edge of the respective lens wafer and oriented at a predetermined angle relative to the respective optical axis.

20. At least two ophthalmic lens wafers as defined in claim 16, wherein the first and second means are each defined by a pair of raised surface areas formed on the peripheral edge of the respective lens wafer and spaced a predetermined distance relative to each other, and the predetermined distance for the first pair is different than the predetermined distance for the second pair.

* * * * *